(12) United States Patent
Sarangapani et al.

(10) Patent No.: US 9,689,964 B2
(45) Date of Patent: Jun. 27, 2017

(54) ELECTRONIC RECEIVER DEVICE DETECTION SYSTEM AND METHOD

(71) Applicant: The Curators of the University of Missouri, Columbia, MO (US)

(72) Inventors: Jagannathan Sarangapani, Rolla, MO (US); Maciej Jan Zawodniok, Rolla, MO (US); Vivek Thotla, Rolla, MO (US); Mohammad Tayeb Ghasr, Rolla, MO (US); Jake Hertenstein, Chesterfield, MO (US)

(73) Assignee: The Curators of the University of Missouri, Columbia, MO (US)

( * ) Notice: Subject to any disclaimer, the term of this patent is extended or adjusted under 35 U.S.C. 154(b) by 283 days.

(21) Appl. No.: 14/259,668

(22) Filed: Apr. 23, 2014

(65) Prior Publication Data

US 2016/0216358 A1    Jul. 28, 2016

Related U.S. Application Data

(60) Provisional application No. 61/854,388, filed on Apr. 23, 2013.

(51) Int. Cl.
*G01S 5/02* (2010.01)
*G01S 7/41* (2006.01)
(Continued)

(52) U.S. Cl.
CPC .............. *G01S 5/0226* (2013.01); *G01S 5/12* (2013.01); *G01S 7/41* (2013.01); *G01V 3/12* (2013.01)

(58) Field of Classification Search
CPC ........ G01S 5/02; G01S 5/0252; G01S 5/0278; G01S 5/0284; G01S 7/02; G01S 7/021;
(Continued)

(56) References Cited

U.S. PATENT DOCUMENTS

| 4,053,891 A | 10/1977 | Opitz |
| 5,191,343 A | 3/1993 | Danzer et al. |

(Continued)

OTHER PUBLICATIONS

"Spectre ELITE:Radar Detector Detector"; no author listed; copyright 2015; on the website stalkerradar.com; printed out on Jul. 7, 2016; Applied Concepts, Inc.; Plano, Texas, USA.*
(Continued)

*Primary Examiner* — Bernarr Gregory
(74) *Attorney, Agent, or Firm* — Polsinelli PC

(57) ABSTRACT

A super regenerative receiver detection system and method that includes a computing system that stores and executes a cross modulation correlation component to modulate a radio-frequency (RF) stimulation signal that is transmitted in an area using a modulating signal having a first modulating mode, and receive a response UEE signal from the area in which the response UEE signal includes a cross modulated signal emitted from a super regenerative receiver (SRR). The cross modulated signal having a second modulation mode that is different from the first modulation mode. Using this information, the cross modulation correlation component processes the received UEE signal to determine a cross modulation correlation level of a cross modulation signal relative to the modulating signal, and generates an alert signal when the determined cross modulation correlation level exceeds a specified threshold.

20 Claims, 9 Drawing Sheets

(51) Int. Cl.
*G01V 3/12* (2006.01)
*G01S 5/12* (2006.01)
*G01S 5/00* (2006.01)
*G01S 7/00* (2006.01)
*G01V 3/00* (2006.01)

(58) Field of Classification Search
CPC ... G01S 7/38; G01S 7/41; G01S 7/411; G01S 7/412; G01S 5/0205; G01S 5/0226; G01S 5/12; H04B 1/02; H04B 1/04; H04K 3/40; H04K 3/45; F41H 11/12; F41H 11/13; F42D 5/04; G01V 1/22; G01V 1/223; G01V 3/12
See application file for complete search history.

(56) References Cited

U.S. PATENT DOCUMENTS

| | | | |
|---|---|---|---|
| 5,430,392 A | 7/1995 | Matejic | |
| 5,592,170 A * | 1/1997 | Price | G01S 7/412 342/22 |
| 5,717,656 A | 2/1998 | Dourbal | |
| 5,856,803 A | 1/1999 | Pevler | |
| 5,990,791 A | 11/1999 | Andreasen et al. | |
| 6,163,259 A | 12/2000 | Barsumian et al. | |
| 6,359,582 B1 | 3/2002 | MacAleese et al. | |
| 6,580,915 B1 | 6/2003 | Kroll | |
| 6,765,492 B2 | 7/2004 | Harris | |
| 6,765,527 B2 * | 7/2004 | Jablonski | G01S 7/41 342/193 |
| 6,850,735 B2 | 2/2005 | Sugar et al. | |
| 6,895,343 B2 | 5/2005 | Jacobsen et al. | |
| 6,897,777 B2 | 5/2005 | Holmes et al. | |
| 6,993,438 B2 | 1/2006 | Jacobsen et al. | |
| 7,130,624 B1 * | 10/2006 | Jackson | H04B 1/04 455/420 |
| 7,162,285 B2 | 1/2007 | Owens et al. | |
| 7,317,419 B2 | 1/2008 | Sugar et al. | |
| 7,464,005 B1 * | 12/2008 | Beetner | G01S 7/412 342/463 |
| 7,492,303 B1 * | 2/2009 | Levitan | G01S 7/411 342/188 |
| 7,512,511 B1 * | 3/2009 | Schultz | G01S 7/38 250/250 |
| 7,515,094 B2 * | 4/2009 | Keller, III | G01S 7/412 342/13 |
| 7,639,178 B1 * | 12/2009 | Mulbrook | G01S 7/41 342/127 |
| 7,680,599 B1 * | 3/2010 | Steadman | G01V 1/223 702/14 |
| 7,717,023 B2 * | 5/2010 | Pereira | F42D 5/04 86/50 |
| 7,796,961 B2 * | 9/2010 | Karlsson | H04K 3/45 455/101 |
| 7,864,107 B1 * | 1/2011 | Lehtola | G01S 7/41 342/146 |
| 7,999,723 B2 * | 8/2011 | Jung | G01V 3/12 340/572.2 |
| 8,063,813 B1 * | 11/2011 | Keller | G01S 7/38 340/572.2 |
| 8,099,893 B2 * | 1/2012 | Jung | G01S 7/38 42/14 |
| 8,193,965 B2 * | 6/2012 | O'Donnell | G01S 7/02 342/22 |
| 8,392,149 B1 * | 3/2013 | Spencer | G01S 7/021 702/193 |
| 9,316,732 B1 * | 4/2016 | Mohamadi | G01S 7/411 |
| 9,329,001 B2 * | 5/2016 | Mohamadi | F41H 11/13 |
| 2004/0183712 A1 | 9/2004 | Levitan et al. | |
| 2004/0218714 A1 | 11/2004 | Faust | |
| 2006/0038677 A1 | 2/2006 | Diener et al. | |
| 2006/0082488 A1 | 4/2006 | Keller, III | |

OTHER PUBLICATIONS

Hubing, T. et al., "Electromagnetic Detection and Identification of Automobiles," Euroem'04 Abstract, Jul. 16, 2004, Magdeburg, Germany.

Dong, X. et al., "Identification of Vehicles Based on Their Electromagnetic Emissions," UMR EMC Laboratory Technical Brief, Oct. 2004, pp. 1-17.

Weng, H. et al., "Unintended Radiation from Improvised Explosive Devices," UMR EMC Laboratory Technical Brief, Oct. 2004, pp. 1-24.

Weng, H. et al., "Neural Network Detection and Identification of Electronic Devices Based on Their Unintended Emissions," Electromagnetic Compatibility Laboratory, University of Missouri-Rolla, May 2005, pp. 245-249, IEEE.

International Search Report and Written Opinion for PCT/US2008/64940 dated Feb. 4, 2009; 6 pgs.

Beetner, D. et al., "Detection and Location of Wireless Command-Initiated Improvised Explosive Devices (IEDs)," University of Missouri-Rolla Electromagnetic Compatibility Laboratory, Jul. 30, 2004, pp. 1-7.

Koehler, S., "Scientists work on a way to alert soldiers to hidden explosive devices," News-Leader.com, Springfield, Missouri, Oct. 24, 2004, pp. 1-4.

* cited by examiner

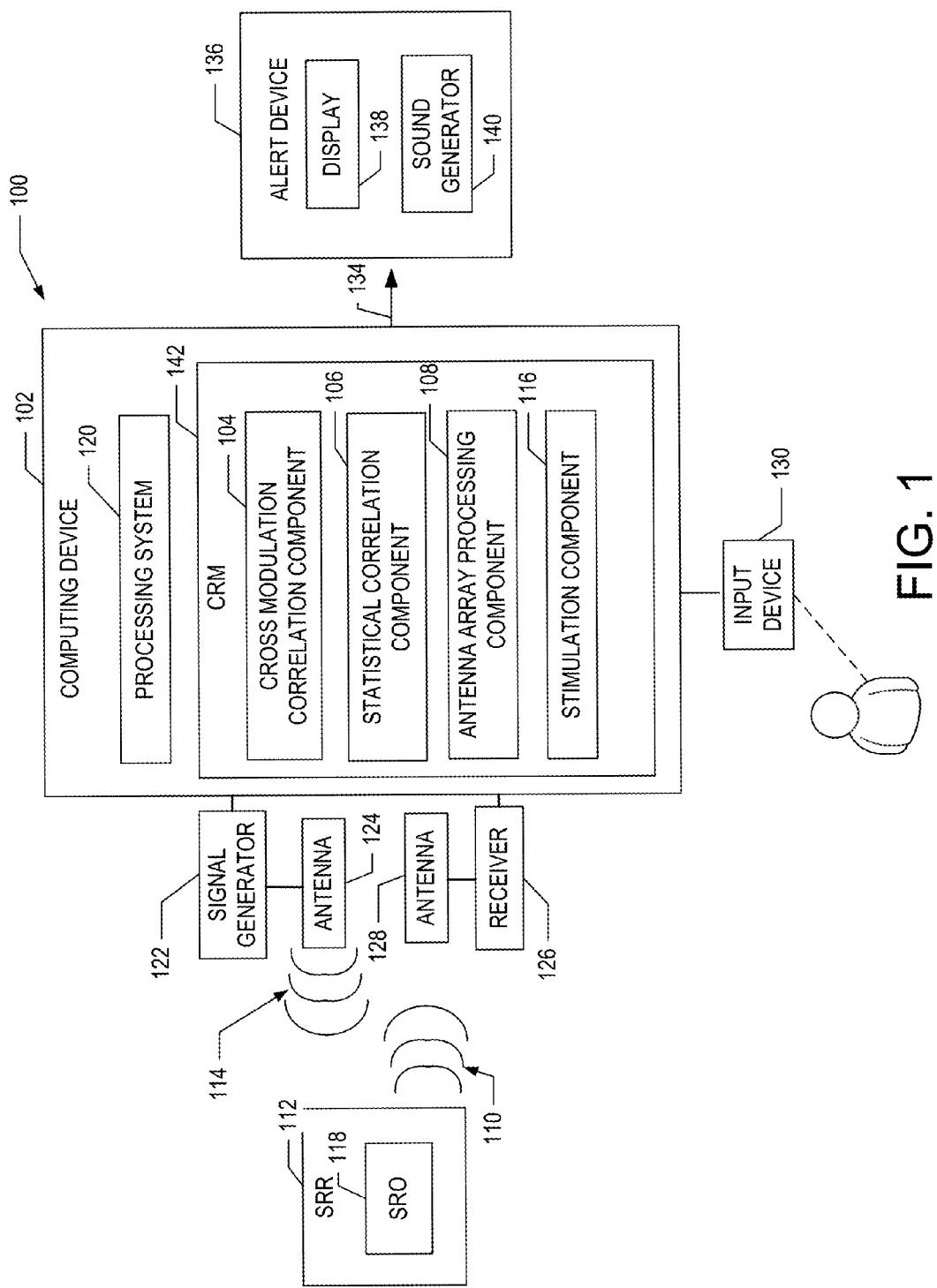

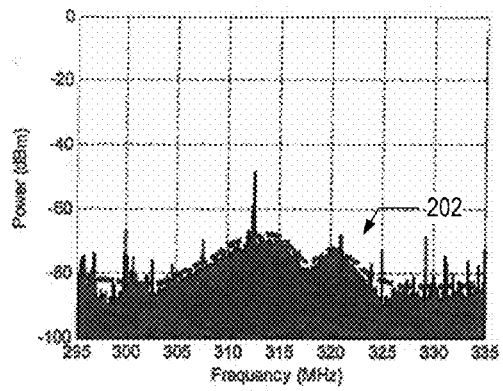
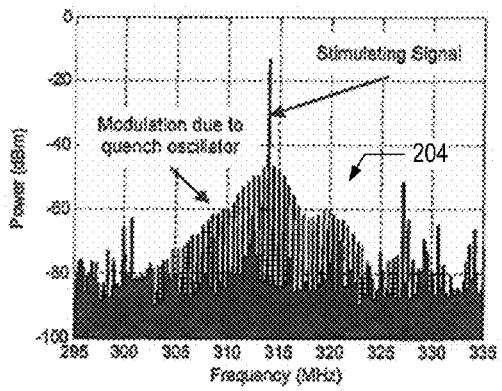
FIG. 2A  FIG. 2B
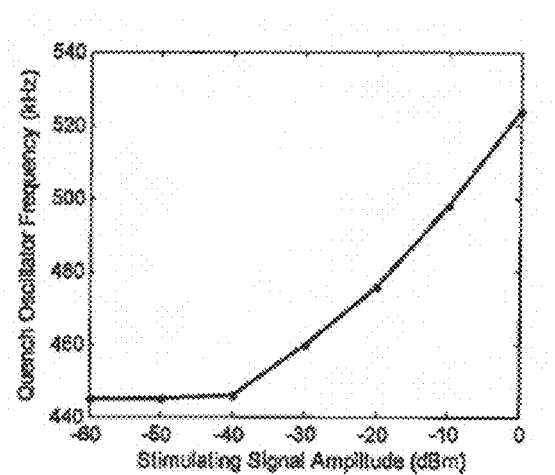
FIG. 3

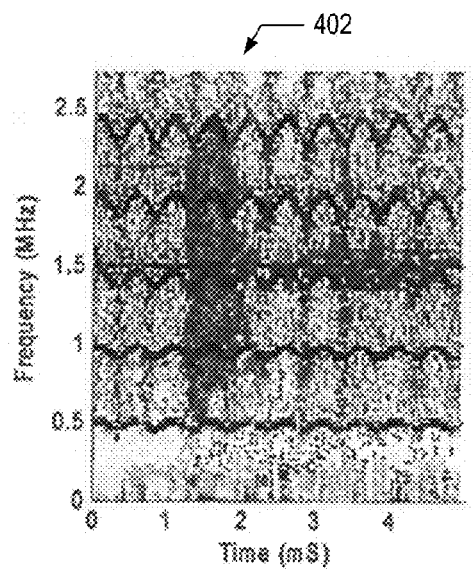 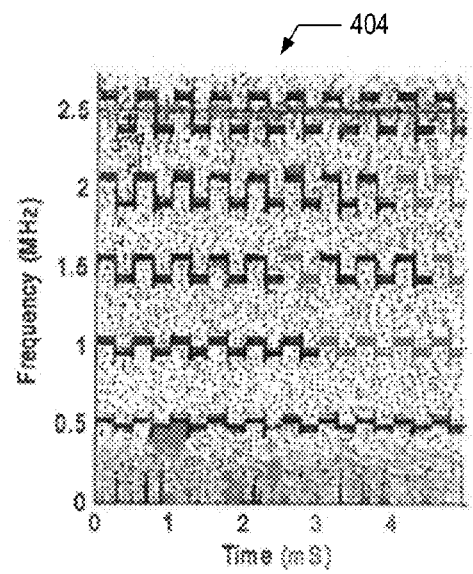
FIG. 4A  FIG. 4B
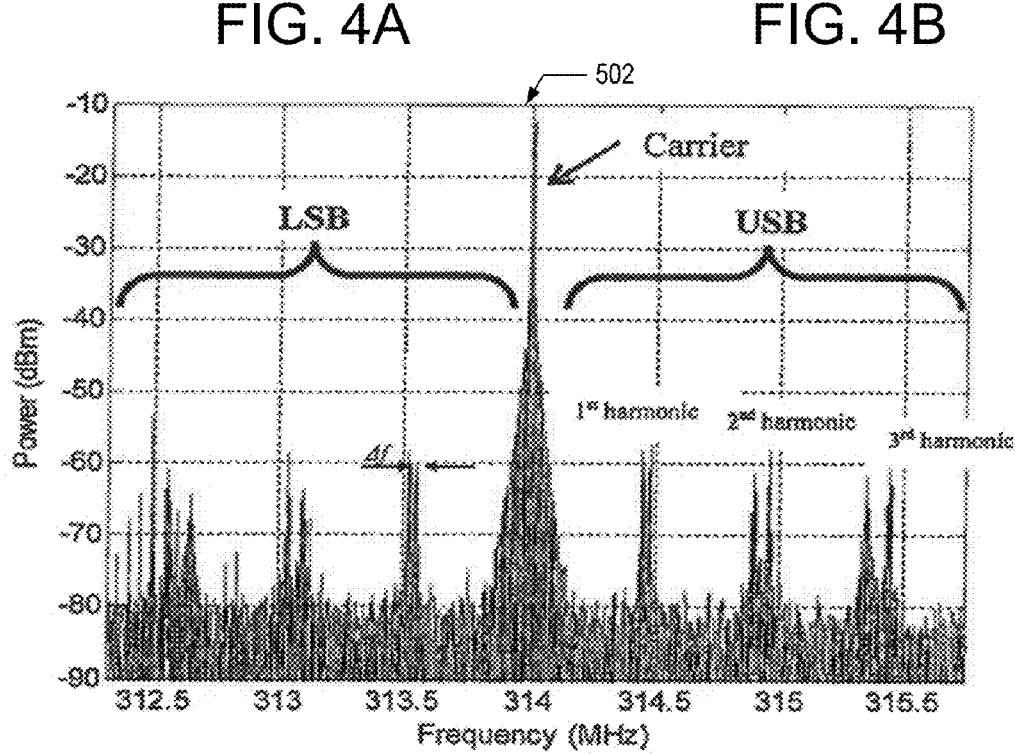
FIG. 5

ELECTRONIC RECEIVER DEVICE DETECTION SYSTEM AND METHOD

RELATED APPLICATIONS

This application takes priority to U.S. Patent Application No. 61/854,388, filed Apr. 23, 2013, and entitled Stimulation and Detection of Super Regenerative Receivers and Super Heterodyne Receivers, the entire contents of which are incorporated herein by reference.

FEDERALLY SPONSORED RESEARCH OR DEVELOPMENT

This invention was made in part from Government support under grant no. W911 NF-10-2-0077 from the Army Research Laboratory. The Government has certain rights in the invention.

FIELD

The present document relates to the field of electromagnetic emissions detection, and more particularly to a system and method for detecting super-regenerative receivers.

BACKGROUND

Improvised explosive devices ("IEDs") are insidious tools used by terrorists and insurgents that can cause injury or death to armed service personnel and civilians. Typically constructed with common, inexpensive components, IEDs can be hidden along roads, in vehicles, in buildings, and many other locations, and, thus can hinder the ability of troops to maneuver effectively in combat zones. Most IEDs employ radio receivers and/or low-cost electronic circuits that allow for remote detonation. Critical to reducing the threats posed by IEDs is the development of systems and methods that allow for effective detection and location of IEDs from safe distances.

Electronic devices employing digital and/or analog radio frequency (RF) circuits emit unintended electromagnetic radiation emissions. Although relatively weak, these emissions can be measured to detect, identify, and locate such electronic devices. The ability to detect, identify and localize the source of these unintended emissions is important for IED detection. Electronic devices used in IEDs are typically used as triggers for explosive devices. Such devices are typically off-the-shelf low cost commercial radio receivers, which predominantly includes two types of receiver topologies. A first receiver topology includes those devices employing a superheterodyne receiver, such as cell-phones and walkie-talkies. Super heterodyne receivers typically include a sinusoidal local oscillator (LO) that generates unintended emissions at low levels that can be detected. A second receiver topology includes super regenerative receivers (SRR), which are commonly found in low cost consumer devices, such as wireless doorbells, garage door openers, and the like. These devices do not contain local oscillators and as such, do not normally produce strong unintentional emissions.

SUMMARY

According to one embodiment, unique unintended emissions from a specific device may be used for detection. Various techniques are used to process the unintended electromagnetic emissions (UEE) of an electronic device for identification.

In one aspect, an electronic receiver device detection system is provided. The system includes a computing system that stores and executes a cross modulation correlation component to modulate a radio-frequency (RF) stimulation signal that is transmitted in an area using a modulating signal having a first modulating mode. The system receives a response UEE signal from a super regenerative receiver (SRR) within the area. The response UEE signal includes a cross modulated signal emitted from a super regenerative receiver (SRR). The cross modulated signal has a second modulation mode that is different from the first modulation mode. Using this information, the cross modulation correlation component processes the received UEE signal to determine a cross modulation correlation level of a cross modulation signal relative to the modulating signal, and generates an alert signal when the determined cross modulation correlation level exceeds a specified threshold.

According to another aspect, another electronic receiver device detection system is provided. The system includes a computing system that stores and executes a statistical correlation component to generate a noise floor statistical self-similarity parameter for an area. The noise floor statistical self-similarity parameter is generated in the absence of any SRRs in the area and prior to detecting a response UEE signal. The statistical correlation component stores the generated noise floor statistical self-similarity parameter in a memory. Thereafter, when a SRR in the area generates a response UEE signal in response to a RF stimulation signal that is transmitted in the area, the statistical correlation component determines a SRR statistical self-similarity parameter from the response UEE signal. The statistical correlation component further generates an alert signal when the determined SRR statistical self-similarity parameter exceeds the noise floor statistical self-similarity parameter.

According to yet another aspect, an electronic receiver device detecting method is provided. The method includes modulating a RF stimulation signal that is transmitted in an area using a modulating signal having a first modulating mode, and receiving a response UEE signal from the area. The response UEE signal includes a cross modulated signal emitted from a SRR. The cross modulated signal has a second modulation mode that is different from the first modulation mode. The method further includes processing the received UEE signal to determine a cross modulation correlation level of a cross modulation signal relative to the modulating signal, and generating an alert signal when the determined cross modulation correlation level exceeds a specified threshold.

Additional objectives, advantages and novel features will be set forth in the description which follows or will become apparent to those skilled in the art upon examination of the drawings and detailed description that follows.

BRIEF DESCRIPTION OF THE DRAWINGS

FIG. 1 illustrates an example super-regenerative receiver (SRR) detection system according to one embodiment of the present disclosure.

FIGS. 2A and 2B illustrate an example passive emission and a stimulated unintentional electromagnetic emission (UEE) signal, respectively, that may be generated by a SRR.

FIG. 3 illustrates an example frequency variation exhibited by a SRR in response to receipt of a stimulated signal that is amplitude modulated.

FIGS. 4A and 4B illustrate example spectrograms of the emissions from a SRR in response to sinusoidal modulation and square wave modulation, respectively, after down-conversion and filtering of an amplitude modulated stimulating signal.

FIG. 5 illustrates an example pass-band spectrum of the received unintended emission from a SRR when stimulated with a square-wave modulated signal.

Corresponding reference characters indicate corresponding elements among the several views. The headings used in the figures should not be interpreted to limit the scope of the figures.

DETAILED DESCRIPTION

Figure 6:
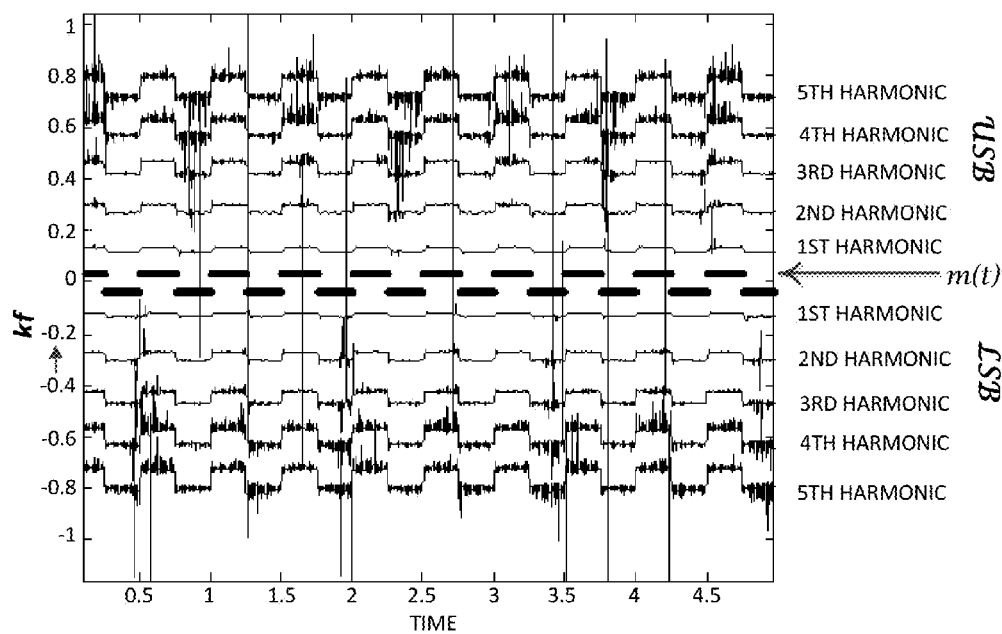
FIG. 6 shows the frequency-demodulated signals from five harmonics on each side-band of the SRR stimulated emission.

Referring to the drawings, a system and method for implementing a super-regenerative receiver (SRR) detection system 100 is generally indicated as 100 in FIG. 1. The SRR detection system 100 includes a computing device 102 that comprises various operational components for facilitating SRR detection and/or location in accordance with aspects of the SRR detection system 100. In general, the SRR detection system 100 includes a cross modulation correlation component 104, a statistical correlation component 106, and an antenna array processing component 108 that process various characteristics of UEE signals 110 emitted by super regenerative receivers (SRRs) 112 in response to stimulation signals 114 generated under control of a stimulation component 116. As will be described in detail below, the cross modulation correlation component 104, the statistical correlation component 106, and/or the antenna array processing component 108 may be used for detecting the presence and/or location of a SRR 112.

Virtually all active electronic devices emit electromagnetic energy, either intentionally or unintentionally. It has been discovered that such unintentional electromagnetic emissions (i.e., UEEs) have specific qualities that can be used for detection. For example, although super-regenerative receivers (SRRs) are widely used in short range RF communication, they do not normally generate strong unintentional emissions when compared with super heterodyne receivers employing local oscillators that generate detectable unintentional emissions.

The SRR 112 may be embodied in any device, such as a remote controlled toy, a garage door opener, and the like. The SRR 112 generally includes a super regenerative oscillator (SRO) 118, when operated in transient mode, is used to filter and amplify weak incoming radio frequency (RF) signals. As such, the incoming RF signal becomes amplitude modulated (i.e., pulsating) by a signal which is dependent upon the fundamental frequency of the SRO 118 (e.g., quench oscillator). SRRs are often self-quenched in the sense that the quenching is generated from the SRO 118 itself. Self-quenched SRRs are preferred in many applications since they do not require a separate oscillator. A low noise amplifier (LNA) configured in the SRR prevents much of this strong modulated signal to leak back though the antenna; however, some signal does leak out especially in low cost commercial devices such as remote control toy cars and wireless doorbells. Consequently, this leaked signal can be used to detect the presence and/or location of such devices. Embodiments of the present disclosure provide a system and method for detecting the presence, identity, and location of SRRs.

The SRR detection system 100 also includes a stimulation component 116 that can be executed by the computing device 102 to control a signal generator 122 to generate the stimulation signal 114 that is transmitted by an antenna 124 in an area where a SRR 112 is suspected to exist. If a SRR 112 is within the area of the stimulation signal 114, the SRO 118 of the SRR 112 may respond by generating a UEE signal 110 that is received by a receiver 126 using an antenna 128 and processed by the cross modulation correlation component 104, the statistical correlation component 106, and/or the antenna array processing component 108 to determine its presence and/or location within the area. The stimulation component 116 is responsive to input received from an operator of an input device 130 of the computing device 102 to generate the known stimulation signal 114 to apply to the surrounding environment. The cross modulation correlation component 104, statistical correlation component 106, and antenna array processing component 108 are also responsive to input received from the operator of the input device 130 to process the received UEE signal 110 for detecting the presence and/or location of the SRR 112.

Processing a received UEE signal may include, for example, match filtering of the UEE signal 110 with the stimulated signal, determining the oscillating frequency of a detected SRO 118 when used with the cross modulation correlation component 104, and array processing to determine the direction and/or distance of the SRR 112 from the antenna 128. When used with the statistical correlation component 106, processing may include, for example, determining one or more noise floor values for differing environments, and determining a Hurst (H) parameter from the UEE signal 110.

Any of the cross modulation correlation component 104, statistical correlation component 106, or antenna array processing component 108 can generate an alert signal 134 that is provided to an alert device 136 to notify the operator that the SRR 112 has been detected. The alert device 136 can be a display 138 operatively coupled to the computing device 102 for providing a visual alert to the operator.

In other aspects, the alert device 136 includes a sound generator 140 operatively and/or communicatively coupled to the computing device 102 for generating an audible alert to the operator. In one aspect of the SRR detection system 100, the sound generator 140 processes the alert signal 134 to produce an audible alert that the operator, if trained properly, can identify a particular type or category of SRR by listening to the audible alert. In other words, different SRRs 112 can each have a unique sound associated there-with such that the operator can be trained to identify the type of device based on the generated unique sound.

The cross modulation correlation component 104 detects the presence of SRRs by determining a level of cross modulation exhibited in the UEE signal 110. In one embodiment, the cross modulation correlation component 104 is configured to detect a non-linear response when the SRRs 112 are stimulated using an amplitude modulated (AM) signal. It has been found that unintentional emissions from an SRR 112 become frequency modulated (FM) in response to an AM stimulation signal. Consequently, frequency demodulation may be used to coherently detect the unintentional emissions from the SRR 112. The frequency demodulated signal is then correlated with the stimulating signal for determining the SRR's 112 existence. In other embodiments, other forms of modulation modes, such as phase modulation, may be implemented for either modulation of the stimulation signal, or for detecting correlated components in the received UEE signal.

FIGS. 2A and 2B illustrate example passive emission 202 (e.g., emissions without stimulating signal) and an stimulated unintentional electromagnetic emission (UEE) signals 204 (e.g., emissions with stimulating signal), respectively, that may be generated by an SRR. The passive emission signal is generated by the SRR in the absence of any external stimulation signal. In general, the passive emission is relatively weak and resembles noise that is shaped by the SRR's filter. This emission is due to the response of the SRO 118 to noise at its input. Other signals, represented by spikes in the spectrum, are background signals. However, when the SRR 112 is actively stimulated using a sinusoidal signal, the level of the emission is increased as shown in FIG. 2B. In this case the emissions take the form of an amplitude modulated signal as represented by:

$$V_s = A \cos(2\pi f_d t) \quad \text{[Eqn. 1]}$$

$$V_o = AK_\zeta(2\pi f_q t)\cos(2\pi f_d t) \quad \text{[Eqn. 2]}$$

K is the cumulative gain and ζ(.) is the effective quenching signal with frequency fq. The quenching signal typically has a saw tooth waveform as represented by all the even and odd harmonics shown in Eqn. 1.

Thus, active stimulation of a SRR 112 may result in more robust detection capabilities for a longer range. Beside the increase in the power level of the unintended emissions, these emissions have deterministic characteristics, via the operation of a quenching signal generated by the SRO 118, that aid in the detection and identification of such devices. The fundamental frequency (fq) in self-quenched SRRs changes with the power of the stimulating signal. FIG. 3 illustrates an example frequency variation exhibited by a SRR 112 in response to receipt of a stimulated signal that is amplitude modulated. The graph shown in FIG. 3 also illustrates that the response of the SRR 112 does not appreciably change when the stimulating signal amplitude is below a certain specified level (e.g., −40 dBm). Thus, the nonlinear response of the SRR 112 may be used for its detection, identity, and/or location.

By amplitude modulating the stimulated signal, the SRR 112 will respond by frequency modulating its quenching process. This phenomenon effectively makes the unintended emission from the SRR frequency modulated.

FIGS. 4A and 4B illustrate example spectrograms 402, 404, of the emissions from a SRR 112 in response to sinusoidal modulation and square wave modulation, respectively, after down-conversion and filtering out the strong amplitude modulated stimulating signal (i.e., carrier signal portion) for the sinusoidal and square wave modulating signals. The frequency ranges plotted in this spectrogram cover only the upper side band and the first five harmonics of the quenching signal. This spectrogram shows that the emission is frequency modulated, with higher order harmonics exhibiting progressively larger frequency shifts. The frequency of these harmonics follows the instantaneous power (i.e. power envelope) of the stimulating signal. This phenomenon is apparent when the modulating signal is sinusoidal, where the frequency variation in the harmonics follows a $\sin^2$ pattern. When the modulating signal is square wave the frequency of the harmonics keep the same square wave waveform, hopping between two frequencies in-sync with the modulating signal. These signals can be frequency demodulated and then correlated or match filtered with the modulating signal for detection of the SRR as will be described in detail below.

The following is a mathematical description of the detection technique. The stimulating signal is an amplitude modulated signal given by:

$$V_s(t) = A[1+hm(t)]\cos(2\pi f_d t) \quad \text{[Eqn. 3]}$$

A is the amplitude of the stimulating signal, $f_d$ is the carrier frequency (frequency of the device), h is the modulation depth, and m(t) is the modulating signal, m(t) is assumed to have an amplitude range of ±1 and h must be less than 100% for distortion free modulation. The emitted signal from the SRR takes the form:

$$V_s(t) = A[1+hm(t)]K_\zeta(2\pi[f_q(A^2)+\Delta f \cdot m^2(t)]t)\cos(2\pi f_d t) \quad \text{[Eqn.4]}$$

K is the cumulative gain of the system, ζ(.) is the quenching signal, and $f_q$ is its frequency which is also a function of the stimulating signal amplitude. The received signal $V_e$ is measured, filtered, and then frequency demodulated. Since the only the modulation in frequency is of interest, the actual received signal amplitude does not play a major role in the detection. In other words, as long as the signal is above the noise floor of the measuring instrument, it can be demodulated and thus the device will be successfully detected. No amplitude calibration or gain correction is required. In one embodiment, prior to frequency demodulation, each harmonic of the quenching signal band pass filtered and extracted to determine the quenching frequency according to:

$$V_f(t) = \text{filter}[V_e(t)] \quad \text{[Eqn. 4]}$$

In other embodiments, a search algorithm may be used to find this quenching frequency since it has a distinct modulation pattern. Frequency demodulation can be performed by using many techniques such as via the use of phase-locked loops. Is one embodiment, a Hilbert transform method is used to create the analytic signal and then its instantaneous frequency is measured according to:

$$kf(t) = de \bmod [V_f(t)] \quad \text{[Eqn.5]}$$

f(t) is the instantaneous frequency and k [v/Hz] is the demodulator gain which also depends on the sampling frequency. The demodulated signal is then matched filtered with the modulating signal to obtain the frequency shift (Δf) experienced by the UEE signal. This quantity is then compared with a set threshold to detect the presence of a SRR. In practice, only the non-linear self-quenching SRR devices will respond in frequency modulation to the amplitude modulated stimulation and thus the threshold may be set to a relatively small number (e.g., approximately zero).

FIG. 5 illustrates an example pass-band spectrum 502 of the received unintended emission from a SRR when stimulated with a square-wave modulated signal. In this particular example, the carrier frequency was 314 MHz and the square wave modulating frequency was 2 kHz. This spectrum shows the carrier (stimulating signal) along with harmonics of the quench oscillator at the upper side-band (USB) and lower sideband (LSB) of the spectrum. Although the passband spectrum only shows three harmonics at each sideband, other harmonics may show similar response patterns. As mentioned earlier, the higher order harmonics exhibit a higher frequency modulation proportional to the order of the harmonic. On the other hand, the higher order harmonics may have a lower power level.

FIG. 6 shows the frequency-demodulated signals from five harmonics on each side-band of the SRR stimulated emission. The modulating square wave m(t) is included in the middle of the figure as a reference. This figure clearly shows how the frequency modulation is in-sync with the modulating signal. The higher order harmonics provide a larger frequency shift as expected. On the other hand the demodulated signal from them is noisy due to their lower power.

According to one embodiment, the frequency demodulated signal is match filtered with the modulating square-wave to obtain the frequency shift for each harmonic. This frequency shift, if not zero, represents detection of the SRR device. This technique is not susceptible to the presence of other signal sources.

Figure 7:
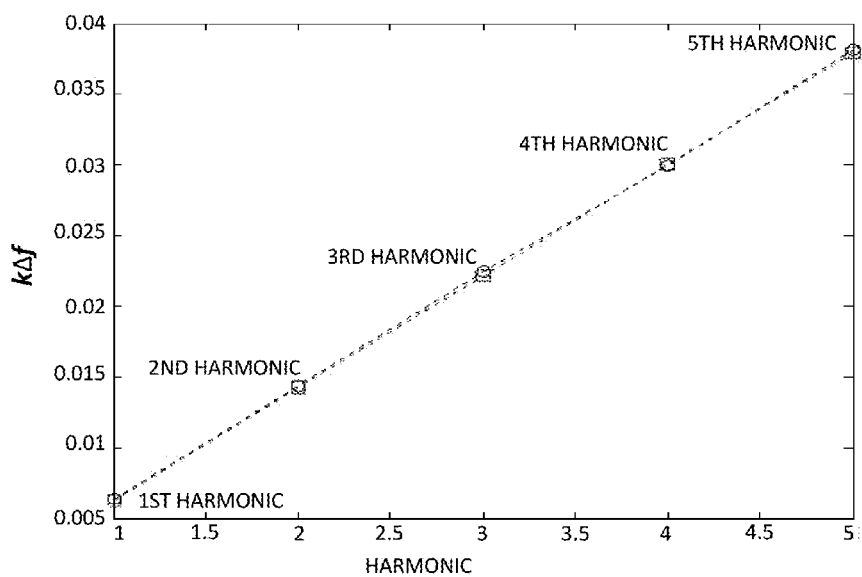
FIG. 7 illustrates the demodulated frequency shift (kΔf) from the harmonic signals of FIG. 6 after match filtering.

FIG. 7 illustrates the demodulated frequency shift (kΔf) from the harmonic signals of FIG. 6 after match filtering. Again, the frequency shift is linearly proportional to the order of the harmonics of the quenching signal. Ideally the measured frequency shift quantities are scaled back and combined using a maximum ratio combiner (MRC).

Figure 8:
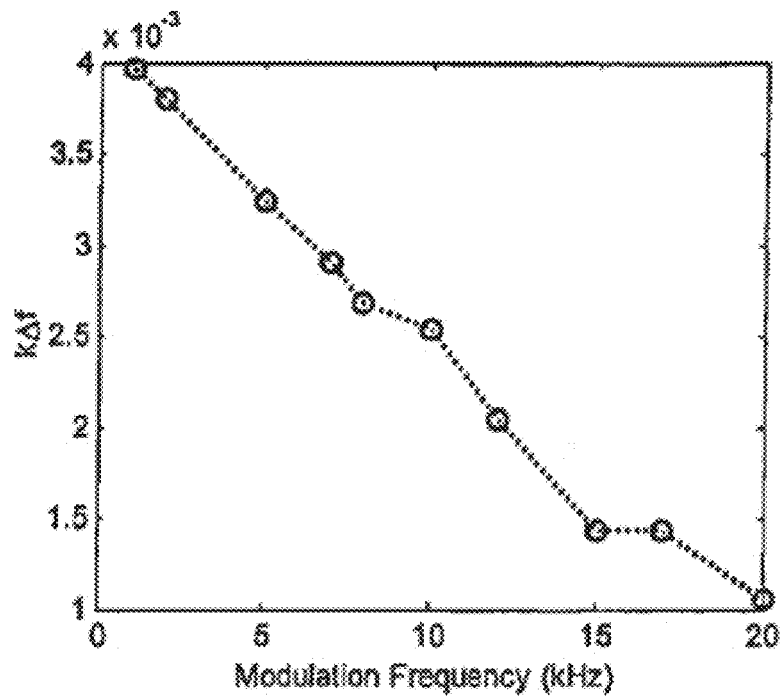
FIG. 8 illustrates the demodulated frequency shift in the SRR's emission versus the frequency of a square wave modulating signal.

Super regenerative receivers are typically designed for narrowband operation. Therefore, the bandwidth (or highest frequency) of the modulating signal should be at least equal to or less than the bandwidth of the SRR. FIG. 8 illustrates the demodulated frequency shift in the SRR's emission versus the frequency of a square wave modulating signal. As expected, the SRR response in terms of frequency modulating its quench oscillator is higher for lower frequencies of modulating signal. Therefore, it is advantageous to used lower frequencies (e.g., 500 Hz to 2 kHz) for the modulating signal.

Figure 9A:
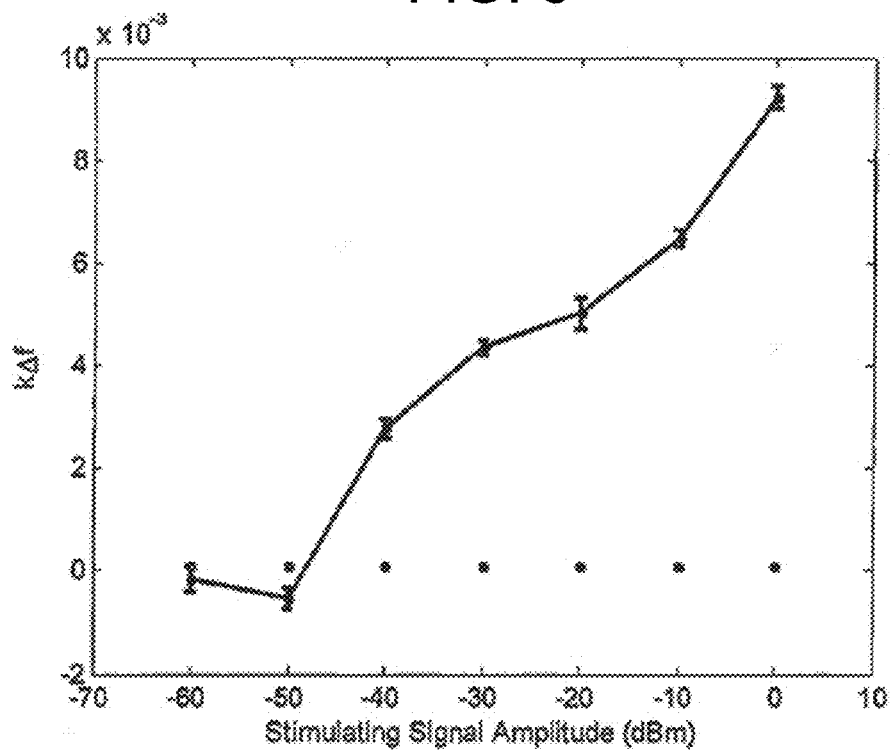
FIG. 9A illustrates the demodulated frequency shift vs. the signal strength of the stimulated signal.

FIG. 9A illustrates the demodulated frequency shift vs. the power of the stimulated signal. This frequency shift is combined over six harmonics (three on each side-band). This figure shows that the frequency shift is monotonically proportional to the power of the stimulating signal. When the power of the stimulating signal is below a certain threshold (less than −40 dBm in this case), the SRR does not respond and the frequency shift is below the noise level denoted by the dotted line. This phenomenon is due to the limited dynamic range of the SRR. For ranging applications, the power of the stimulating signal reaching the SRR should be maintained at or above a specified power level (e.g., −50 dBm) for reliable detection of this particular device.

Figure 9B:
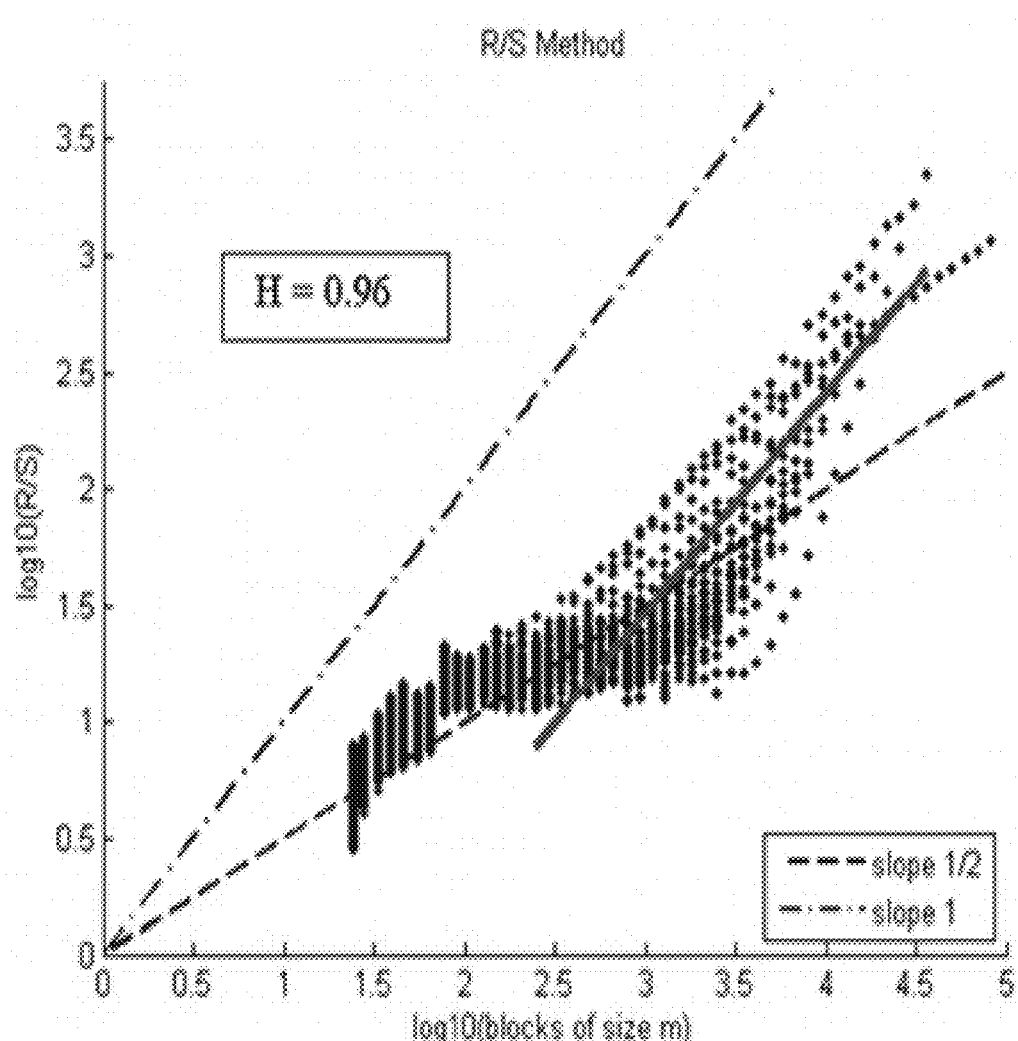
FIG. 9B illustrates an exemplary plot for calculating a Hurst Parameter.

The statistical correlation component 106 performs a statistical self-similarity process of UEE signals to determine if any SRRs exist within an area. Self-similarity is a phenomenon that displays the long range statistical similarities of a process. It can also be defined as a property in which a part of the process is similar to the overall process. A level or quantity of self-similarity may be represented by a Hurst (H) parameter. In one aspect, the statistical correlation component 106 performs a rescaled range (R/S) method to estimate the Hurst parameter for detection of SRRs. As an example, FIG. 9B, depicts a Hurst parameter value (e.g., H=0.96) calculated as the slope of the line fitting the points on block size vs R/S for an ideal signal.

The detection threshold for a measured Hurst parameter is determined based on the variation of the Hurst parameter for the background noise in the given area. In one embodiment, multiple noise floor H values are calculated to determine a nominal noise floor. Next, the maximum H for the background noise is determined. The threshold is equal to the maximum H to account for noise in the area. The threshold can be determined prior to SRR detection for a particular area or calculated during detection using a moving window of measurements. The latter will adapt to changing environment but could fail to detect a slow approaching device that slowly increases the threshold.

The existence of self-similar emissions from a SRR 112 increases a measured Hurst parameter value of the frequency spectrum compared to the Hurst parameter value of background noise. This increase in a measured H parameter value reveals the presence of SRR device. Ideally, self-similarity of the frequency spectrum of the signal from the SRR 112 is independent of signal power. Hence, detection of SRRs using the Hurst parameter (e.g., Second Order Self Similar Property) may be more accurate when compared to the traditional methods including received signal strength (RSS) based detection.

The principle operating characteristic of SRRs 112 includes a SRO (i.e., quench oscillator) that alternates between periods of excitation (e.g., reception) and quenching of a tuned circuit. The quench oscillator determines a timewise length of the interval for the oscillations. In one aspect, it may be modeled as a selective network with a feedback amplifier. The feedback amplifier has a variable gain $K_a(t)$ controlled by the signal from quench oscillator. The feedback helps to control the regenerative actions and the quench signal controls the period of stability and instability of the system.

The emitted SRR response is derived from the SRO for one quench cycle. For analyzing self-similarity of the UEE signal, the response may be modeled by:

$$v_o(t) = VK_0 K_s K_r p(t) \cos(w_0 t + \varnothing) \qquad [\text{Eqn. 6}]$$

$K_0$ is the maximum amplification, $w_0$ is the frequency of oscillations, and $\varnothing$ is the initial phase. In summary, the response is a product of the envelope of the SRO and the cosine wave at the tuned resonant frequency, assuming V and $K = K_0 K_s K_r$ remain relatively constant.

In one embodiment, the statistical correlation component 106 determines UEE signals having H values in the range of 0.5 to 1 to be indicative of the presence of a SRR, and H value below 0.5 to be indicative of no SRR. In other embodiments, any suitable threshold values may be used by the statistical correlation component 106 for determining whether the received UEE signal is indicative of the presence of a SRR.

The antenna array processing component 108 processes UEE signals from an antenna array for enhanced detection of SRRs. The antenna array processing component 108 determines an approximate direction of the SRR 112 relative to the orientation of the antenna 128 and/or an approximate distance of the SRR 112 in which the receive antenna 128 comprises an antenna array.

Figure 10:
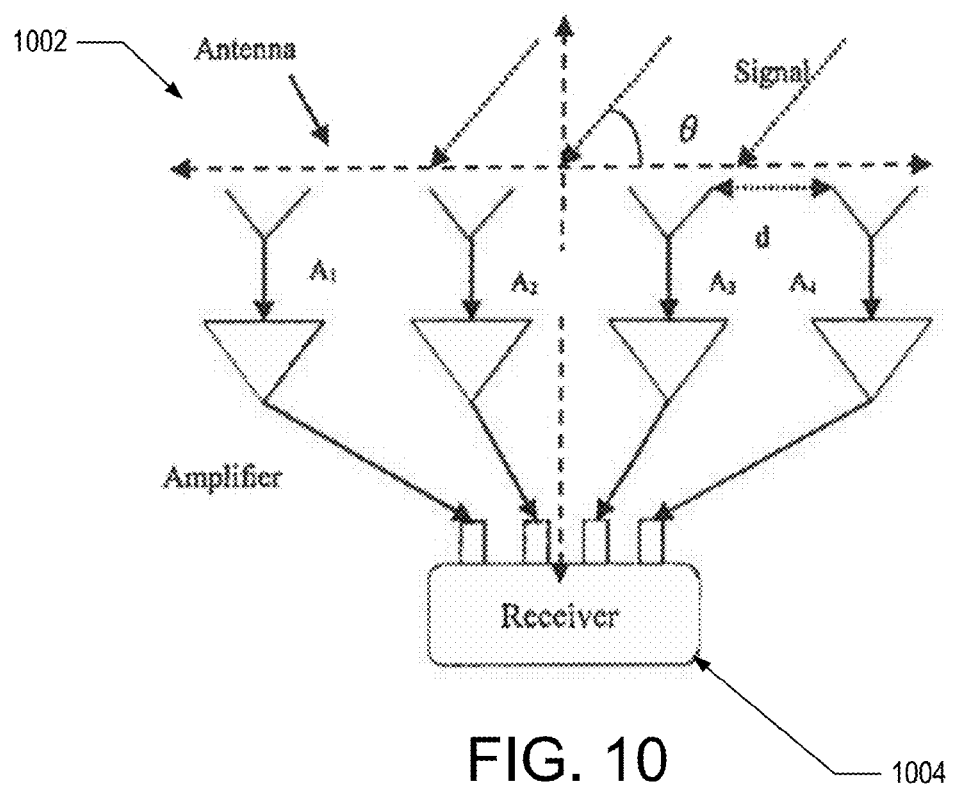
FIG. 10 illustrates an example antenna array that may be used with the SRR detection system according to the teachings of the present disclosure.

FIG. 10 illustrates an example antenna array 1002 that may be used with the SRR detection system 100 according to the teachings of the present disclosure. The antenna array 1002 has multiple antenna elements physically arranged in a 1 by 4 linear pattern in which each antenna element is spaced one-half wavelengths apart. Nevertheless, it should be understood that other embodiments of the antenna array may be arranged in any pattern, such as a two-dimensional pattern (e.g., n by m), or a linear pattern having less than or greater than 4 elements. Although the present disclosure describes the use of an antenna array processing component 108 that processes UEE signals generated by multiple antennas, it should be understood that a single antenna may be implemented if the features and advantages provided by the antenna array processing component 108 and associated antenna array are not needed or desired.

The antenna array 1002 is coupled to a receiver 1004 that processes (e.g., amplifies, filters, etc.) signals received from each element of the antenna array 1002, and provides the processed signals to the antenna array scanning component 108.

Certain embodiments incorporating the antenna array processing component 108 and associated antenna array may provide certain advantages over a single antenna. For example, an antenna array 1002 may provide spatial discrimination of UEE signals for determining the location of the SRR. Additionally, the antenna array 1002 may provide enhanced gain over single antennas, thus providing improved signal strength which results in a larger signal to noise ratio (SNR) for improved detection and identification.

The SRR detection system 100 illustrated in FIG. 1 includes a general purpose computing device (e.g., computing device 102), such as a computer executing computer-executable instructions. The various components of the SRR detection system 100 are stored in a computer readable medium 142 and executed by a processing system 120 including one or more processors. A processor is hardware. Examples of such a system include one or more servers, personal computers, mobile computers and/or other mobile devices, and other computing devices.

The computing device typically has at least some form of computer readable media (e.g., CRM 142). Computer readable media 142, which include both volatile and nonvolatile media, removable and non-removable media, can be any available medium that may be accessed by the general purpose computing device. By way of example and not limitation, computer readable media 142 may include computer storage media and communication media. Computer readable media 142 may further include volatile and nonvolatile, removable and non-removable media implemented in any method or technology for storage of information such as computer readable instructions, data structures, program modules or other data. Communication media may typically embody computer readable instructions, data structures, program modules, or other data in a modulated data signal, such as a carrier wave or other transport mechanism and include any information delivery media. Those skilled in the art will be familiar with the modulated data signal, which may have one or more of characteristics set or changed in such a manner that permits information to be encoded in the signal.

The computing device 102 may include or be capable of accessing computer storage media in the form of removable and/or non-removable, volatile and/or nonvolatile memory. A user may enter commands and information into the computing device through the input device 130. Other input devices (not shown) may also be connected to the computing device 102. The computing device 102 may also operate in a networked environment using logical connections to one or more remote computers.

Other embodiments of the SRR detection system 100 are operational with numerous other general purpose or special purpose computing system environments or configurations. The SRR detection system 100 illustrated in FIG. 1, is not intended to suggest any limitation as to the scope of use or functionality of the various embodiments of the SRR detection system 100. Moreover, the SRR detection system 100 should not be interpreted as having any dependency or requirement relating to any one or combination of components illustrated in the operating environment 100. Examples of well known operating systems, environments, and/or configurations that may be suitable for use in embodiments of the SRR detection system include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Figure 11:
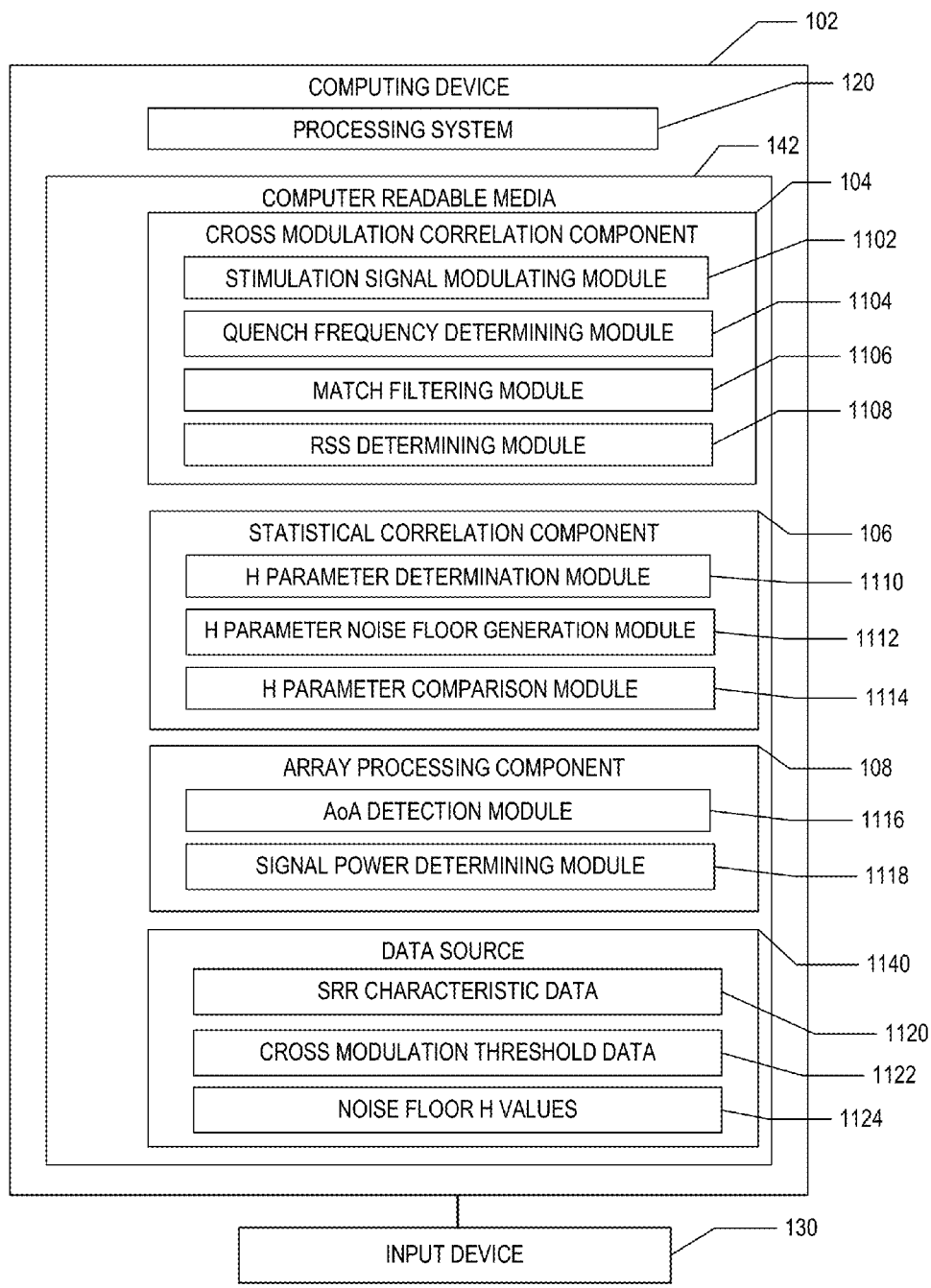
FIG. 11 illustrates an example computing device on which components of the SRR detection system may be executed according to the teachings of the present disclosure.

FIG. 11 illustrates an example computing device 102 on which components of the SRR detection system 100 may be executed according to the teachings of the present disclosure. As shown, each of the operational components comprises one or more modules for facilitating SRR device detection and/or location.

The cross modulation correlation component 104 includes a stimulation signal modulating module 1102, a quench frequency determining module 1104, a match filtering module 1106, and a RSS detecting module 1108. The stimulation signal modulating module 1102 communicates with the stimulation component 116 that controls the signal generator 122 to modulate the stimulation signal 114 transmitted in the area of the SRR 112. For example, the modulating signal may be a sinusoidal signal or a square wave signal. As another example, the modulating signal may be set to a frequency within the passband typically utilized by SRRs (e.g., approximately equal to or less than 2 kilo-Hertz). In one embodiment, the modulating signal may be set to be at, or close to the quench frequency of the SRO of the SRR 112.

The quench frequency determining module 1104 determines the quench frequency of unintended emissions from the SRR 112. In one embodiment in which the type of SRR is known, the quench frequency determining module 1104 determines the quench frequency by accessing SRR characteristic data 1120 stored in a memory associated with that known device. In another embodiment in which the type of SRR is not known, the quench frequency determining module 1104 determines the quench frequency by filtering the UEE signal 110, frequency demodulating the filtered UEE signal 110, followed by extracting harmonics from the frequency demodulated signal from which the quench frequency may be obtained. The harmonics may be extracted using any suitable technique, such as by performing a discrete Fourier transform (DFT) or a fast Fourier transform (FFT) and analyzing the harmonic energy of the signal to determine its respective fundamental frequency, which will be the quench frequency of the SRO in the SRR.

The match filtering module 1106 filters the demodulated signal against the modulated portion of the stimulation signal to obtain the frequency shift experienced by the UEE signal. For example, the match filtering module 1106 may multiply the modulating signal with the demodulated UEE signal to extract a match filtered signal representing a level of frequency shift per excitation level of the stimulation signal.

The SRR detecting module 1108 receives the match filtered signal from the match filtering module 1106 and compares it with the cross modulation threshold data 1122 stored in the memory to determine whether a SRR has been detected. The cross modulation threshold data 1122 may be set to any value. For example, the cross modulation threshold data 1122 may be set according to background noise in the environment; that is, higher for those environments having a relatively high level of electro-magnetic (EM) noise, and lower for those environments having relatively lower levels of EM noise.

The statistical correlation component 106 includes a H determination module 1110, a H parameter noise floor generation module 1112, and a H parameter comparison module 1114. The H parameter determination module 1110 processes a received UEE signal to determine its H value. The H parameter noise floor generation module 1112 generates noise floor H values for the noise floor and stores the noise floor H values 1124 in the data source 1140. The noise floor is defined as electro-magnetic energy received by the system 100 with no SRR or other electro-magnetic radiating device present. In one embodiment, multiple noise floor H values may be generated in which each noise floor H value is measured at varying signal to noise ratios (SNR).

The H parameter comparison module 1114 determines if the H parameter of a received UEE signal exceeds a specified threshold value. For example, the H parameter comparison module 1114 may compare the H value of a received UEE signal against a static value (e.g., 0.5) and generates an alarm if the determined UEE signal H value is greater than the static value. As another example, the H parameter comparison module 1114 compares the UEE signal H value with a noise floor H value stored in the memory, and generates an alarm if the determined UEE signal H value is greater than the noise floor H value.

The array processing component 108 includes an angle of arrival (AoA) determining module 1116 and a signal power determining module 1118. The AoA determining module 1116 is used to estimate the approximate direction of the SRR 112. For example, the AoA determining module 116 may compare the phase relationships among each of multiple UEE signals received from the antenna array and calculate an angle based upon the physical orientation of the antenna array.

The signal power determining module 1118 is used to estimate an approximate distance of the SRR 112 from the receive antenna 128. For example, the signal power determining module 1118 may integrate the UEE signal at the frequency of interest over a period of time to determine the signal strength and thus an estimated distance of the SRR from the antenna.

It should be appreciated that the modules described herein is provided only as examples that perform the various features of the SRR detection system, and that other computing systems may have the same modules, different modules, additional modules, or fewer modules than those described herein. For example, one or more modules as described in FIG. 11 is combined into a single module. As another example, certain modules described herein are encoded on, and executed on one or more other computing systems.

Figure 12:
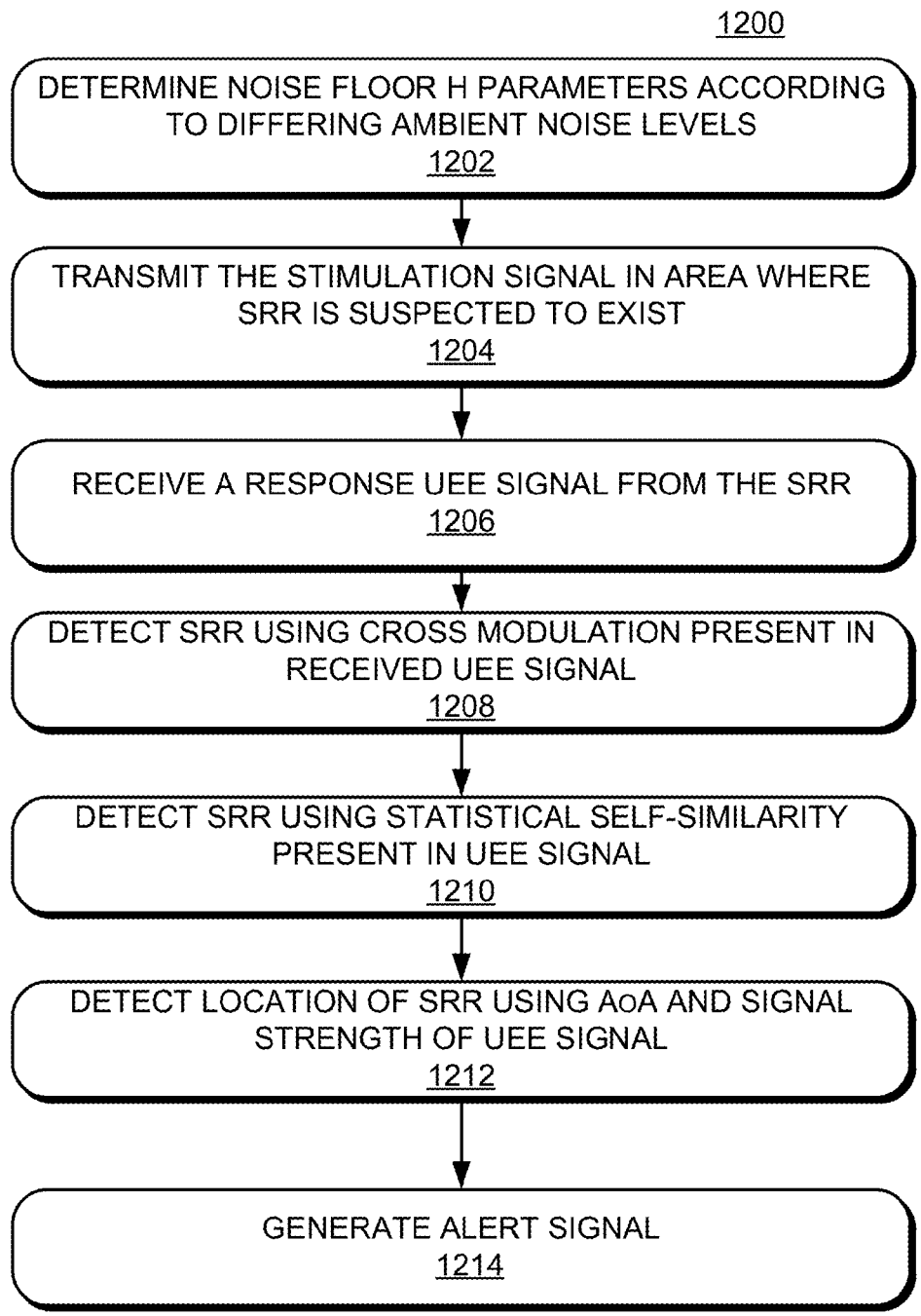
FIG. 12 illustrates an example method that may be performed by the SRR detection system according to one embodiment of the present disclosure.

FIG. 12 illustrates an example method 1200 that may be performed by the SRR detection system 100 according to one embodiment of the present disclosure. At step 1202, the system 100 determines one or more noise floor statistical self-similarity parameters for a corresponding one or more ambient noise environments. Once determined, the noise floor statistical self-similarity parameters are stored in the data source 1140. In one embodiment, the statistical self-similarity parameters are H parameters.

At step 1204, the system 100 transmits a stimulation signal in an area of which a SRR may be detected. In one embodiment, the stimulation signal is modulated with a modulating signal with a modulating mode, such as amplitude modulation. The modulating signal may be any suitable type, such as a sinusoidal wave or a square wave.

At step 1206, the system 100 receives a UEE signal that has been generated by the SRR in response to receipt of the stimulation signal. In one embodiment, the system 100 may receive multiple UEE signals from an antenna array having multiple antenna elements.

At step 1208, the system 100 detects a SRR by determining a cross modulation present in the received UEE signal. In one embodiment, the stimulation signal is modulated with an amplitude modulated signal and the received UEE signal is processed to extract any frequency modulated content included in therein. The system 100 may determine the cross modulation by determining the quench frequency of the SRR, such as by monitoring frequency modulated harmonics information from the UEE signal. The system 100 generates an alert signal when the cross modulation correlation level exceeds a specified threshold level. Furthermore, the specified threshold level may be adapted by the system 100 according to measured ambient noise present in the area.

At step 1210, the system 100 detects the presence of a SRR by using a statistical self-similarity parameter (e.g., H parameter) determined in the UEE signal. For example, the system 100 determines a statistical self-similarity parameter for the received UEE signal and compares the determined parameter against a noise floor statistical self-similarity parameter determined in step 1202.

At step 1212, the system 100 detects a location of the SRR according to multiple signals received through multiple antenna elements of an antenna array. The detection of location may include a direction determined by angle of arrival processing, while range (i.e., distance) may be determined according to a signal strength of the received UEE signal.

At step 1214, the system 100 generates an alert signal if either of the processes of steps 1210 or 1212 determines that a SRR exists in the area. In one embodiment, the system 100 may generate an alert signal according to a combination of steps 1210 or 1212 determines the presence of a SRR in the area.

The order of execution or performance of the operations/steps in embodiments of the SRR detection system 100 illustrated and described herein is not essential, unless otherwise specified. That is, the operations may be performed in any order, unless otherwise specified, and embodiments of the SRR detection system 100 may include additional or fewer operations than those disclosed herein. For example, it is contemplated that executing or performing a particular operation before, contemporaneously with, or after another operation is within the scope of embodiments of the SRR detection system 100.

Embodiments of the SRR detection system 100 may be implemented with computer-executable instructions. The computer-executable instructions may be organized into one or more computer-executable components or modules. Aspects of the invention may be implemented with any number and organization of such components or modules. For example, aspects of the SRR detection system 100 are not limited to the specific computer-executable instructions or the specific components or modules illustrated in the figures and described herein. Other embodiments of the SRR detection system 100 may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An electronic receiver device detection system comprising:
   a stimulation component comprising a signal generator to generate a radio-frequency (RF) stimulation signal and a receiver to receive a response unintended electromagnetic emission (UEE) signal;
   an alert device; and
   a computing system comprising at least one processor and at least one memory for storing a cross modulation correlation component that is executed by the at least one processor to:
      modulate the RF stimulation signal that is transmitted by the signal generator in an area using a modulating signal having a first modulating mode;
      receive via the receiver the response UEE signal emitted from a super regenerative receiver (SRR) within the area, the response UEE signal including a cross modulated signal having a second modulation mode that is different from the first modulation mode;
      process the received UEE signal to determine a cross modulation correlation level of a cross modulation signal relative to the modulating signal; and
      generate an alert signal by the alert device when the determined cross modulation correlation level exceeds a specified threshold.

2. The system of claim 1, wherein the first modulation mode comprises an amplitude modulation and the second modulation mode comprises a frequency modulation.

3. The system of claim 1, wherein the cross modulation correlation component is further executed to:
   determine a quench frequency of the SRR using the cross modulation signal; and
   determine the cross modulation correlation level by match filtering the quench frequency with the modulating signal.

4. The system of claim 3, wherein the cross modulation correlation component is further executed to determine the quench frequency of the SRR by determining one or more harmonics of the cross modulated signal.

5. The system of claim 1, wherein the at least one memory stores an array scanning component that is executed by the at least one processor to:
   receive a plurality of RF UEE signals from the area from a corresponding plurality of antenna elements of an antenna array;
   process the received UEE signals to determine an angle of arrival (AoA) of each UEE signal; and
   determine a direction of the SRR relative to an orientation of the antenna array using the determined AoA.

6. The system of claim 5, wherein the array scanning component is further executed to:
   process the received UEE signals to determine a power level of the UEE signals; and
   determine a distance of the SRR relative to the antenna array using the determined power level.

7. The system of claim 5, wherein the antenna array comprises a linear array having four antenna elements spaced one-half wavelength apart.

8. An electronic receiver device detection system comprising:
   a stimulation component comprising a signal generator to generate a radio-frequency (RF) stimulation signal and a receiver to receive a response unintended electromagnetic emission (UEE) signal;
   an alert device; and
   a computing system comprising at least one processor and at least one memory for storing a statistical correlation component executed by the at least one processor to:
      generate a noise floor statistical self-similarity parameter for an area, the noise floor statistical self-similarity parameter generated using the signal generator in the absence of any super regenerative receiver (SRR) in the area and prior to detecting the response UEE signal;
      store the generated noise floor statistical self-similarity parameter in the at least one memory;
      receive via the receiver the response UEE signal emitted from the SRR within an area, the response UEE signal generated in response to the RF stimulation signal that is transmitted in the area;
      determine a SRR statistical self-similarity parameter from the response UEE signal; and
      generate an alert signal by the alert device when the determined SRR statistical self-similarity parameter exceeds the noise floor statistical self-similarity parameter.

9. The system of claim 8, wherein the statistical self-similarity parameter comprises a Hurst (H) parameter.

10. The system of claim 8, wherein the statistical correlation component is further executed to:
    generate a plurality of statistical self-similarity parameters for each of a plurality of areas having differing background noise levels, wherein each of the plurality of statistical self-similarity parameters are generated prior to detecting the response UEE signal; and
    generate the alert signal using one of the statistical self-similarity parameters selected in accordance with an estimated noise level of the area.

11. The system of claim 8, wherein the at least one memory stores an array scanning component that is executed by the at least one processor to:
    receive a plurality of RF UEE signals from the area from a corresponding plurality of antenna elements of an antenna array;
    process the received UEE signals to determine an angle of arrival (AoA) of each UEE signal; and
    determine a direction of the SRR relative to an orientation of the antenna array using the determined AoA.

12. The system of claim 11, wherein the array scanning component is further executed to:
    process the received UEE signals to determine a power level of the UEE signals; and
    determine a distance of the SRR relative to the antenna array using the determined power level.

13. The system of claim 11, wherein the antenna array comprises a linear array having four antenna elements spaced one-half wavelength apart.

14. An electronic receiver device detecting method comprising:

modulating, by at least one processor executing instructions stored in a non-transitory computer-readable medium, a radio-frequency (RF) stimulation signal that is transmitted in an area using a modulating signal having a first modulating mode;

receiving, by a stimulation component comprising a signal generator to generate a RF stimulation signal and a receiver to receive a response unintended electromagnetic emission (UEE) signal and the at least one processor, a response UEE signal emitted from a super regenerative receiver (SRR) within the area, the response UEE signal including a cross modulated signal having a second modulation mode that is different from the first modulation mode;

processing, by the at least one processor, the received UEE signal to determine a cross modulation correlation level of a cross modulation signal relative to the modulating signal; and generating, by an alert device and the at least one processor, an alert signal when the determined cross modulation correlation level exceeds a specified threshold.

15. The method of claim 14, further comprising:

determining a quench frequency of the SRR using the cross modulation signal; and determining the cross modulation correlation level by match filtering the quench frequency with the modulating signal.

16. The method of claim 15, further comprising determining the quench frequency of the SRR by determining one or more harmonics of the cross modulated signal.

17. The method of claim 14, further comprising:

generating a noise floor statistical self-similarity parameter for the area, the noise floor statistical self-similarity parameter determined in the absence of any SRR in the area and prior to detecting the response UEE signal;

storing the generated noise floor statistical self-similarity parameter in the at least one memory;

determining a SRR statistical self-similarity parameter from the received cross modulated signal; and generating the alert signal when the determined SRR statistical self-similarity parameter exceeds the noise floor statistical self-similarity parameter.

18. The method of claim 14, further comprising:

receiving a plurality of RF UEE signals from the area from a corresponding plurality of antenna elements of an antenna array;

processing the received UEE signals to determine an angle of arrival (AoA) of each UEE signal; and determining a direction of the SRR relative to an orientation of the antenna array using the determined AoA.

19. The method of claim 18, further comprising:

processing the received UEE signals to determine a power level of the UEE signals; and determining a distance of the SRR relative to the antenna array using the determined power level.

20. The method of claim 18, wherein the antenna array comprises a linear array having four antenna elements spaced one-half wavelength apart.

* * * * *